Sept. 4, 1928.
H. W. ASIRE
INTAKE MANIFOLD
Filed Jan. 21, 1925   2 Sheets-Sheet 1
1,683,281
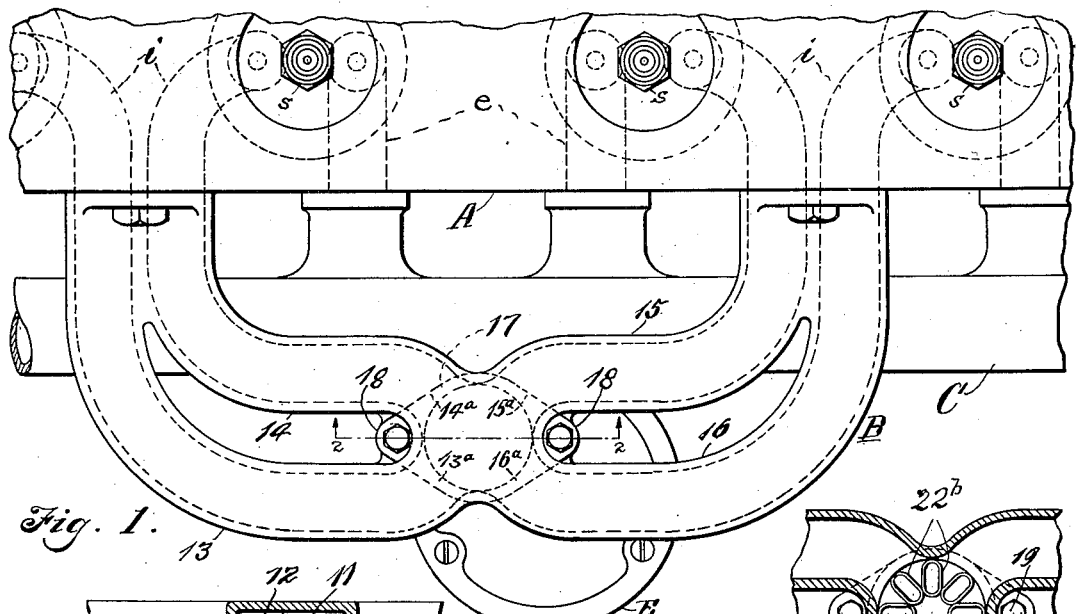
Fig. 1.
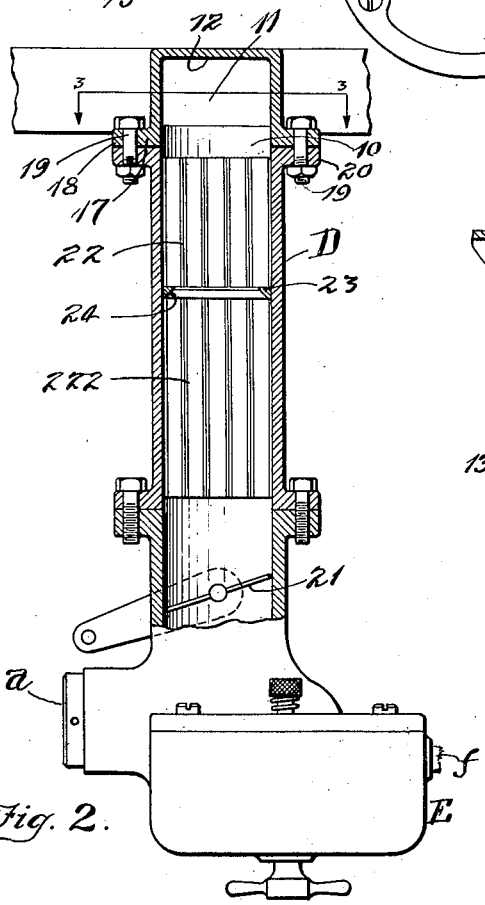
Fig. 2.
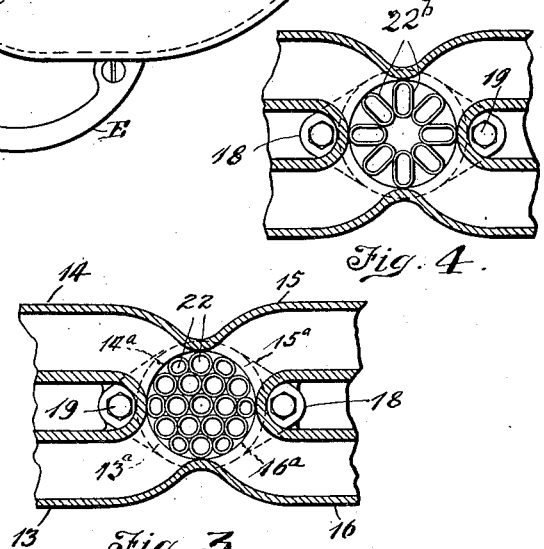
Fig. 4.
Fig. 3.
Fig. 5.
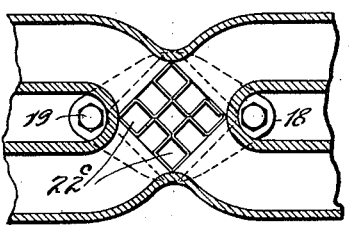
Inventor
Horace W. Asire
By Spencer, Sewall & Hardman,
his Attorneys Patented Sept. 4, 1928.

1,683,281

UNITED STATES PATENT OFFICE.

HORACE W. ASIRE, OF DAYTON, OHIO, ASSIGNOR TO GENERAL MOTORS RESEARCH CORPORATION, OF DAYTON, OHIO, A CORPORATION OF DELAWARE.

INTAKE MANIFOLD.

Application filed January 21, 1925. Serial No. 3,822.

This invention relates to intake manifolds for multiple-cylinder, internal-combustion engines using liquid fuel.

A principal object of the invention is to apportion the fuel delivered to the manifold equally among the several cylinders, thereby avoiding waste of fuel, misfiring of the charge in certain cylinders and attaining improved efficiency.

The invention consists in a manifold having a plurality of branches or limbs, respectively leading to one of the several cylinders from a common mixture-receiving space, and in appurtenances and conformations adapted to effect the delivery of substantially equal quantities of combustible mixture through each of the several branches to the respective cylinders. It further consists in the combinations, sub-combinations and details of construction more specifically set forth in the ensuing description, illustrated in the accompanying drawings and defined in the appended claims.

In the accompanying drawings, in which like reference characters indicate like parts throughout the several views:

Fig. 1 is a plan view of a manifold embodying this invention attached to a cylinder block;

Fig. 2 is a front elevation, partly in section, on the line 2—2 of Fig. 1, of the central portion of the manifold, the riser and an attached carburetor;

Fig. 3 is a section on the line 3—3 of Fig. 2, disclosing a multiplicity of straightener passages in the course of the mixture for preventing turbulence or eddying of the mixture passing to the engine;

Figs. 4 and 5 are views similar to Fig. 3, showing modified forms of straightener passages;

Figure 6:
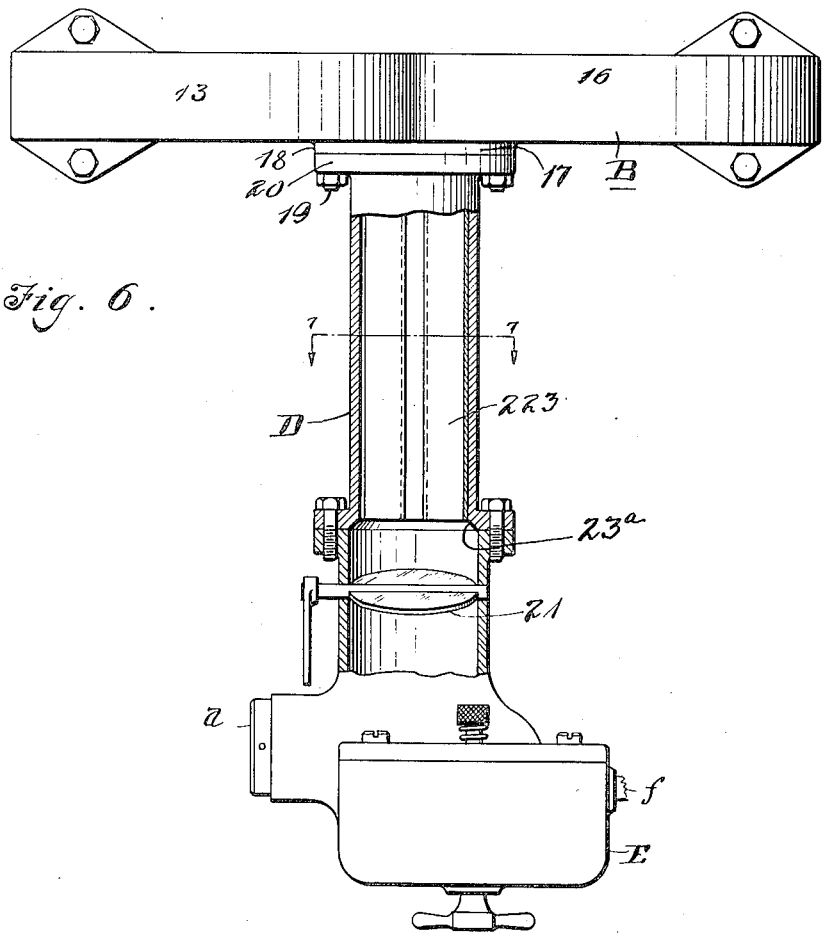
Fig. 6 is a front elevation, partly in section, of another embodiment of the invention.

A well recognized and ever increasing difficulty has been encountered in starting internal-combustion engines of the type in which charges of liquid fuel and air are formed outside of the combustion chamber and drawn into it by the inspiration stroke of the piston. With typical manifolds hitherto in use this difficulty has increased as the volatility of motor fuels supplied to motorists has decreased, and is markedly noticeable in cold weather. Even after the engine has started, unless quite high heat is applied to the charge, the engine requires to be run for a considerable period before the charge is fired equally in all cylinders and equal power is delivered by each. The difficulty referred to is primarily due to unequal distribution of fuel to the several cylinders. Substantially equal distribution can be obtained by highly heating the mixture of air and fuel that passes through the manifold, and it is a quite common practice to utilize the heat of the exhaust gases to transfer heat to the air that is mixed with the fuel and also to the mixture within the carburetion space or within the manifold. Improvement in distribution by application of heat results of course from the conversion of the liquid fuel with the air stream into a gaseous or vaporous aeriform fluid upon which the form of manifold has comparatively little effect in so far as influence on distribution is concerned. But it will be apparent that when the mixture enters the cylinders in highly-heated and expanded condition the volumetric efficiency of the engine is lower than when the mixture enters in a cooler condition. So that preliminary high heating of the charge is an expedient adopted in an attempt to secure good distribution in which volumetric efficiency is sacrificed. It has long been known that single-cylinder engines of the type now under consideration can be started and operated satisfactorily without substantial preliminary heating of the charge. The difficulty of similarly starting and operating multicylinder engines charged from a single carburetor has been due in some measure to accumulations of liquid fuel in different quantities on different portions of the manifold walls with the result that the inspiration stroke of one piston may draw an excess of fuel to its cylinder while another cylinder may be starved. The unequal deposit of liquid fuel is thought to be due, in part at least, to turbulence and irregularities of the currents of air and fuel mixtures in the manifold and riser. The manifold and riser illustrated and described herein have been so planned and constructed as to avoid unequal deposits of liquid at different areas of the manifold and riser.

In the drawings, A indicates a fragment of a cylinder block of a multicylinder internal-combustion engine. The engine illustrated is a four-cylinder engine, but it will be understood that the invention is applicable to engines having a different number of cylinders. B indicates a conductor for a fuel mixture consisting of an intake manifold embodying characteristic features of this invention. C is an exhaust manifold; D a riser connected with the intake manifold B, and E is a conventional illustration of a standard carburetor. The carburetor comprises the usual constant-level fuel bowl, having a fuel intake at $f$. There is an air intake at $a$, whereby air may be mixed with fuel to produce a combustible mixture, which flows through the riser into the manifold B. The intake ports in the cylinder block are indicated at $i$, the exhaust ports by $e$ and the spark plugs by $s$.

The intake manifold B has a mixture intake port 10 at the point where the riser is connected to the manifold. Above the port 10 is a mixture-receiving space 11, over the top of which, directly opposite the port 10, is a substantially smooth, flat surface 12 within the manifold, which is preferably perpendicular to the axis of the intake port. Branching from the mixture-receiving space 11, are four mixture conduits 13, 14, 15 and 16, shown as rectangular in section. The ports $13^a$, $14^a$, $15^a$ and $16^a$, leading from said mixture-receiving space 11 into the branch conduits are symmetrically disposed around said space, the centers of the ports being in the illustrated embodiment 90° apart. Conduit 13 leads to the intake port $i$ of #1 cylinder; conduit 14 to the intake port of #2 cylinder; conduit 15 to the intake port of #3 cylinder, and conduit 16 to the intake port of #4 cylinder. Thus, the several branch conduits are independent of each other and not in communication excepting where they join the common mixture-receiving space 11.

The riser D is joined to the manifold B so that the passageway through it registers with the port 10. The junction may be effected by any suitable means. In so far as the operation of the riser and manifold is concerned, the riser may be integral with the manifold or separate. As illustrated, the manifold has a boss 17 on its lower face, the lower surface of which is machined. Projecting laterally from the boss between the branches or limbs 13, 14, and 15, 16, of the manifold are perforated lugs or ears 18. The upper end of riser D is flanged as at 20 and provided with perforations adapted to register with the perforations in the ears 18 to receive the bolts 19, by which the riser may be rigidly and tightly secured to the manifold. The lower end of the riser may be flanged and perforated like the upper end in order that a carburetor may, by means of a corresponding flange thereon, be bolted to the lower end of the riser.

The usual throttle valve 21 is disposed in the mixing chamber of the carburetor and the usual connection to the throttle may be provided whereby the operator may adjust it.

In the riser there are means that subdivide the passage for the mixture into a plurality of relatively small passageways or conduits. As illustrated in Fig. 6, there may be one series of small passageways or conduits, but it is preferred that two such series be arranged in tandem or series relation, as illustrated in Fig. 2. The plural passageways referred to serve as straighteners for any aeriform fluid drawn upward through the riser by the operation of the engine pistons. When fuel mixture is drawn by the inspiration of the engine past the throttle valve, into the ordinary riser a high degree of turbulence is imparted to the mixture current and this turbulence has the effect of depositing the liquid fuel drops which are mingled with the air, upon different parts of the riser and manifold in such a manner that there is no uniformity in the degree or place of deposit of these drops, with the result that there is an unequal distribution of liquid fuel among the several engine cylinders. By subdividing, in the manner described, the interior of a mixture conduit leading to a plurality of cylinders, the turbulent mixture current is straightened out and thus the unequal distribution referred to is eliminated or minimized.

Two groups of straightener tubes shown in Fig. 2 are separated from each other, one group 22 being disposed above the other group 222. In Fig. 6 only one group 223 of straightener tubes or passageways is shown. When two groups are used, as is preferred, the upper group should be made shorter than the lower as indicated in Fig. 2 and in the space between them there should be an equalizer ring 23. In Fig. 6 an equalizer ring $23^a$ is shown as formed in the material of the riser and disposed immediately below the lower end of the straightener. The equalizer ring, whether it be formed as indicated in Fig. 2 or as indicated in Fig. 6, should preferably have a beveled surface 24 on that side of the equalizer which faces the approaching mixture. Although circumferential distribution of liquid around the passage is effected as well by a ring that is not beveled, a beveled surface is preferred because of its effect upon the aeriform current. If the ring is projected but slightly into the mixture passage the leading edge over which the liquid fuel must flow on its way to the engine cylinder, preferably should be sharp. If made wider the edge may be rounded. The function of the equalizer ring is to obstruct the flow of liquid along the walls of the riser or mixing chamber of the carburetor, as the case may be, and cause it to disseminate around the wall before flowing over the inside corner of the ring and proceeding toward the cylinders. Were it not for this ring it might occur that the liquid would deposit on one side or another of the passageway and thus reach the mixture-receiving space 11 in such position that more liquid would be drawn to one cylinder than to another. When the equalizing ring is present the flow of liquid along the wall of the mixture conduit is dammed, the liquid is equally distributed circumferentially around the wall and finally overflows the sharp edge of the ring into the aeriform current to the mixture-receiving space.

Figure 7:
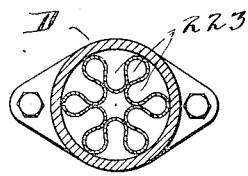
Fig. 7 is a section on line 7—7 of Fig. 6, illustrating a preferred construction providing straightener passages.

The small passages of the straightener may be of varied cross-section and may be produced in different ways. The passages 22 may be formed by a bundle of small round-section tubes inserted in the riser as illustrated in Fig. 3. In Fig. 4 the tubes 22$^b$ are shown as flattened and grouped in radial positions around a central space. In Fig. 5 the subdivisions of the straightener are formed by crimping a sheet of metal and then folding it in such way as to produce a series of square-sectioned passages 22$^c$, while as shown in Fig. 7, which illustrates a preferred form, a sheet of metal is crimped, as around circular rods or mandrels, so as to form a sheet having alternately arranged and juxtaposed closed loops. This sheet may then be bent so as to fit within the riser of the manifold or any other conduit for conducting fuel mixture to multiple-cylinders.

The equipment illustrated and described is intended to effect equal distribution of fuel to a multiplicity of cylinders even where little or no heat is preliminarily applied to the mixture.

In operation, the pumping action of the engine draws air and liquid fuel into the mixture chamber of the carburetor and carries it thence in the form of a fog of air and liquid fuel, or as a current of air with small drops of liquid fuel floating in it, toward the manifold. The turbulence imparted to the current in the mixing chamber is removed by the straighteners so that the mixture is delivered into the receiving space 11 in a straight current free from eddies. Whatever heavy drops there may be in the air current impinge upon the flat surface 12 because of the fact that their specific gravity is greater than that of the air. The air and light particles of liquid are of course diverted into that one of the branches of the manifold which is subject to the suction of the engine at the moment. Also the spatter from the surface 12 follows the air currents and that which adheres spreads evenly over the flat surface. If any liquid is deposited upon the walls of the riser or mixing chamber, it will creep along said wall until it encounters the equalizer ring. There it will be dammed and if the deposit is on one side the ring will cause it to disseminate circumferentially so that when ultimately it overflows the dam presented by the ring it will pass upward equally distributed in the air stream. The axis of the mixture-receiving space and port leading thereto is in a plane midway between the inlet ports of cylinders 1 and 4, and also of course, midway between the entrance ports of cylinders 2 and 3, and mixture flowing in the riser, equalized in distribution and straightened as described, has little or no tendency to flow more to one cylinder than to another. The branch conduits of the manifold being spaced equally around the common mixture-receiving space receive each substantially an equal portion of the mixture. Thus it is possible to operate a multi-cylinder engine charged from a common carburetor on cold mixtures at high efficiency, because substantially equal distribution to the several cylinders is afforded.

While specific embodiments of the invention have been illustrated and described, it is not the intention to limit the protection asked to those embodiments or otherwise than by the terms of the appended claims.

What is claimed is as follows:

1. A device for distributing fuel mixture from a source of supply to the several cylinder intake ports of a multicylinder internal-combustion engine, comprising in combination, a manifold having a plurality of conduits symmetrically disposed about a mixture-receiving space; a riser connecting the source of fuel mixture with said mixture-receiving space; straighteners provided in the riser for at least a portion of its length and affording a plurality of straight passageways adapted to deliver, under normal operating conditions, all of the fuel mixture passing through the riser in a straight, unobstructed flow to the mixture-receiving space; and an equalizer ring in the riser located anterior to at least a portion of the straighteners, said ring being adapted to obstruct the flow of fuel mixture along the wall of the riser and to direct it toward the center thereof.

2. A device for distributing fuel mixture from a source of supply to the several cylinder intake ports of a multicylinder internal-combustion engine, comprising in combination, a manifold having a plurality of conduits symmetrically disposed about a mixture-receiving space; a riser connecting the source of fuel mixture supply with said mixture-receiving space; a pair of straightener units provided in spaced relation in the riser and affording a plurality of straight passageways adapted to deliver, under normal operating conditions, the fuel mixture passing through the riser in a straight, unobstructed flow to the mixture-receiving space; and an equalizer ring disposed within the riser between the straightener units.

3. A device for distributing fuel mixture from a source of supply to the several cylinder intake ports of a multicylinder internal-combustion engine, comprising in combination, a manifold having a plurality of conduits symmetrically disposed about a mixture-receiving space; a riser connecting the mixture receiving space with a source of fuel mixture from which a mixture of air and liquid fuel particles is delivered to the riser in a turbulent condition and straightening elements in the riser providing a plurality of straight passageways through which the fuel mixture passes, said passage-ways causing all the fuel mixture flowing through the riser to travel in straight unobstructed paths to the mixture receiving space under normal operating conditions, to secure even distribution of the fuel particles in the mixture.

4. A device for distributing atomized fuel mixture from a source of supply to the several cylinder intake ports of a multicylinder internal-combustion engine, comprising in combination, a manifold having a plurality of conduits symmetrically disposed about a mixture-receiving space having a flat surface; a riser connecting the mixture-receiving space with a source of fuel mixture from which a mixture of air and liquid fuel particles is delivered to the riser in a turbulent condition; and straightening elements in the riser extending in a direction perpendicular to the flat surface of the mixture-receiving space, and providing a plurality of straight passageways through which the fuel mixture passes, said passageways causing all the fuel mixture flowing through the riser to travel in straight unobstructed paths to the mixture receiving space under normal operating conditions in a direction normal to the said flat surface, to secure even distribution of the fuel particles in the mixture.

In testimony whereof I hereto affix my signature.

HORACE W. ASIRE.